US011955327B2

(12) United States Patent
Yoshinari et al.

(10) Patent No.: US 11,955,327 B2
(45) Date of Patent: Apr. 9, 2024

(54) ION DETECTOR

(71) Applicant: Hitachi High-Tech Corporation, Tokyo (JP)

(72) Inventors: Kiyomi Yoshinari, Tokyo (JP); Masuyuki Sugiyama, Tokyo (JP); Yuichiro Hashimoto, Tokyo (JP); Shin Imamura, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 477 days.

(21) Appl. No.: 17/433,133

(22) PCT Filed: Jan. 22, 2020

(86) PCT No.: PCT/JP2020/002073
§ 371 (c)(1),
(2) Date: Aug. 23, 2021

(87) PCT Pub. No.: WO2020/195062
PCT Pub. Date: Oct. 1, 2020

(65) Prior Publication Data
US 2022/0181138 A1     Jun. 9, 2022

(30) Foreign Application Priority Data
Mar. 28, 2019   (JP) ................................ 2019-062915

(51) Int. Cl.
*H01J 49/42*       (2006.01)
*G01N 27/623*      (2021.01)
(Continued)

(52) U.S. Cl.
CPC ............ *H01J 49/42* (2013.01); *G01N 27/623* (2021.01); *G01T 1/2018* (2013.01); *G01T 1/28* (2013.01)

(58) Field of Classification Search
CPC .. H01J 49/00; H01J 49/02; H01J 49/42; H01J 49/025; H01J 49/0095; H01J 49/26; G01N 27/623; G01T 1/2018; G01T 1/28
(Continued)

(56) References Cited

U.S. PATENT DOCUMENTS 4,810,882 A   3/1989 Bateman
4,996,422 A   2/1991 Mitsui et al.
(Continued)

FOREIGN PATENT DOCUMENTS

JP   60-143759 A   7/1985
JP   63-276862 A   11/1988
(Continued)

OTHER PUBLICATIONS

International Search Report (PCT/ISA/210) issued in PCT Application No. PCT/JP2020/002073 dated Mar. 24, 2020 with English translation (six (6) pages).
(Continued)

*Primary Examiner* — Jason L McCormack
(74) *Attorney, Agent, or Firm* — Crowell & Moring LLP

(57) ABSTRACT

The present invention implements an ion detector with which it is possible to avoid direct collisions of negative ions with a scintillator, prevent degradation of the scintillator, prolong life of the scintillator, reduce the need for maintenance, and perform highly sensitive detection of both positive and negative ions. With respect to a reference line 65 connecting a central point 63 of a positive ion CD 52 and a central point 64 of a counter electrode 54, a central point 66 of a negative ion CD 53 is provided in a region of a side opposite to a region of a side of a central point 67 of a scintillator 56. Positive ions entering from an ion entrance 62 receive a deflection force and collide with the positive ion CD 52 to generate secondary electrons. The generated
(Continued)

secondary electrons collide with the scintillator 56 to generate light. The generated light passes through a light guide 59 and is detected by a photomultiplier tube 58. A negative potential barrier is generated along the reference line 65. Negative ions entering form the ion entrance 62 are attracted to and collide with the negative ion CD 53 to generate positive ions. The generated positive ions collide with the positive ion CD 52 to generate secondary electrons. The generated secondary electrons collide with the scintillator 56 and are detected by the photomultiplier tube 58.

14 Claims, 24 Drawing Sheets

(51) Int. Cl.
*G01T 1/20* (2006.01)
*G01T 1/28* (2006.01)

(58) Field of Classification Search
USPC .................................................. 250/281, 282
See application file for complete search history.

(56) References Cited

U.S. PATENT DOCUMENTS

| | | | |
|---|---|---|---|
| 2004/0061054 A1* | 4/2004 | Kondo | H01J 29/385 |
| | | | 250/310 |
| 2009/0294654 A1 | 12/2009 | Steiner | |
| 2012/0025085 A1* | 2/2012 | Kotani | G01T 1/28 |
| | | | 250/361 R |

FOREIGN PATENT DOCUMENTS

| | | | |
|---|---|---|---|
| JP | 1-304649 A | 12/1989 | |
| JP | 10-154483 A | 6/1998 | |
| JP | 2001-351566 A | 12/2001 | |
| JP | 2012-49110 A | 3/2012 | |
| JP | 5818542 B2 | 11/2015 | |
| WO | WO 2008/025135 A1 | 3/2008 | |

OTHER PUBLICATIONS

Japanese-language Written Opinion (PCT/ISA/237) issued in PCT Application No. PCT/JP2020/002073 dated Mar. 24, 2020 (four (4) pages).

\* cited by examiner

[FIG. 1]
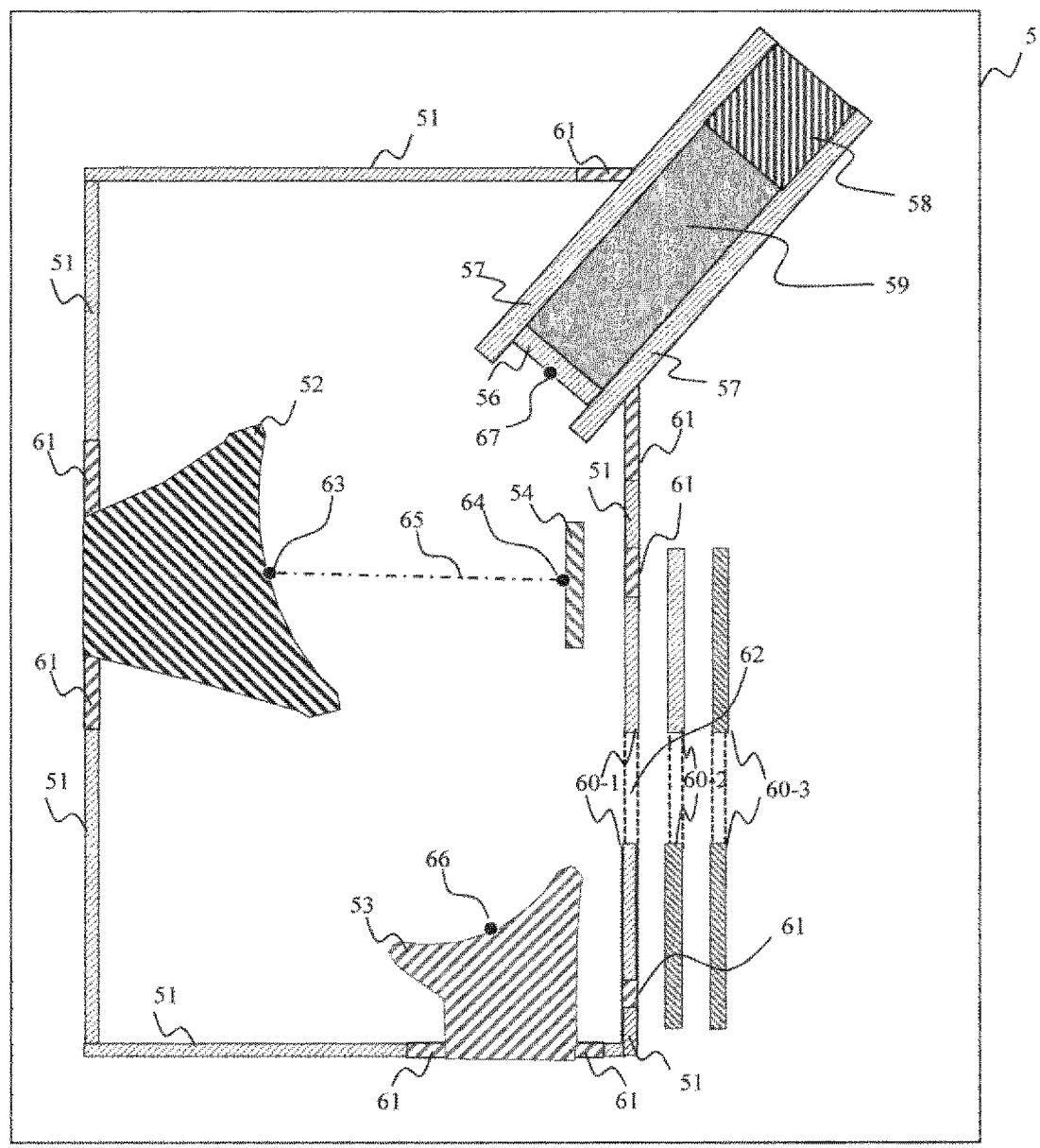

[FIG. 2A]
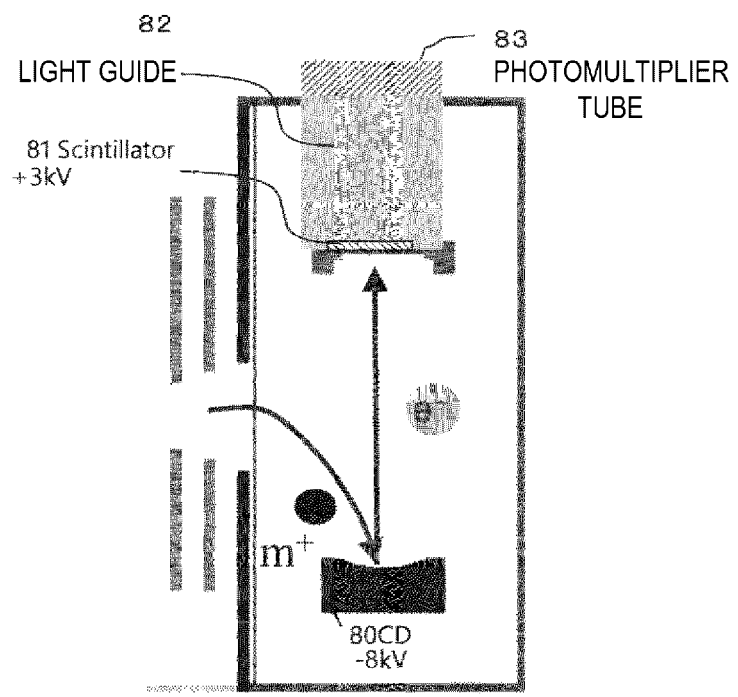
(1) AT THE TIME OF DETECTING POSITIVE IONS
<RELATED ART>

[FIG. 2B]
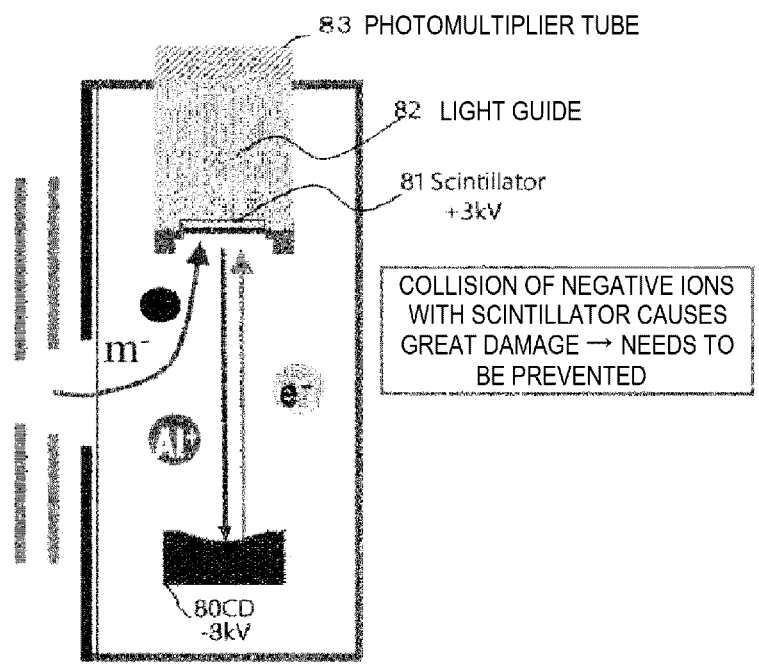
(2) AT THE TIME OF DETECTING NEGATIVE IONS
<RELATED ART>

[FIG. 3A]
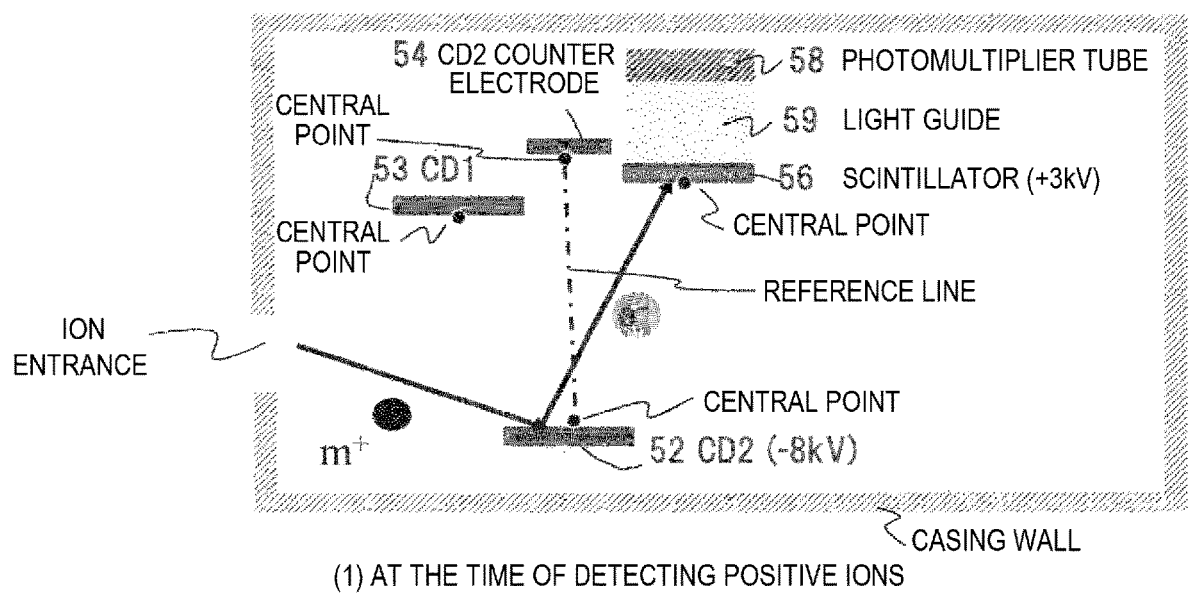
(1) AT THE TIME OF DETECTING POSITIVE IONS

[FIG. 3B]
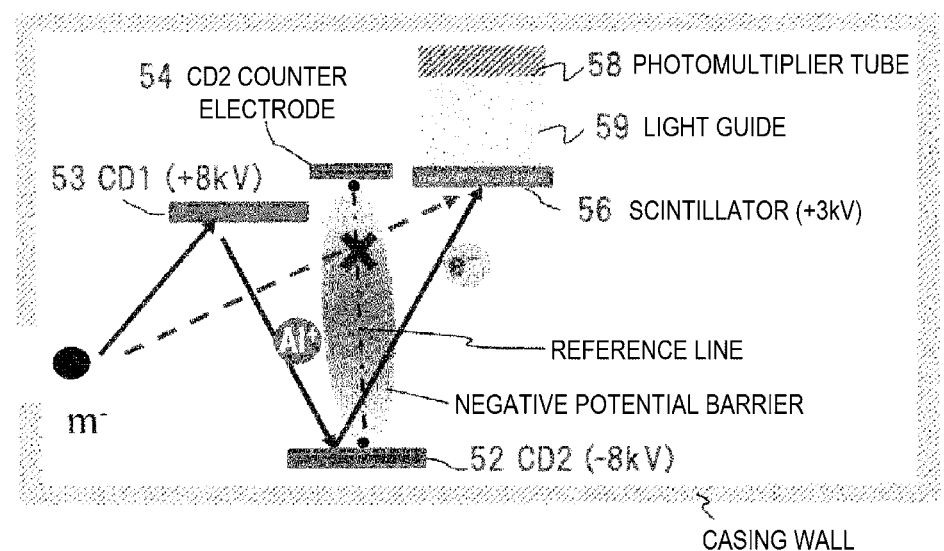
(2) AT THE TIME OF DETECTING NEGATIVE IONS

[FIG. 4]
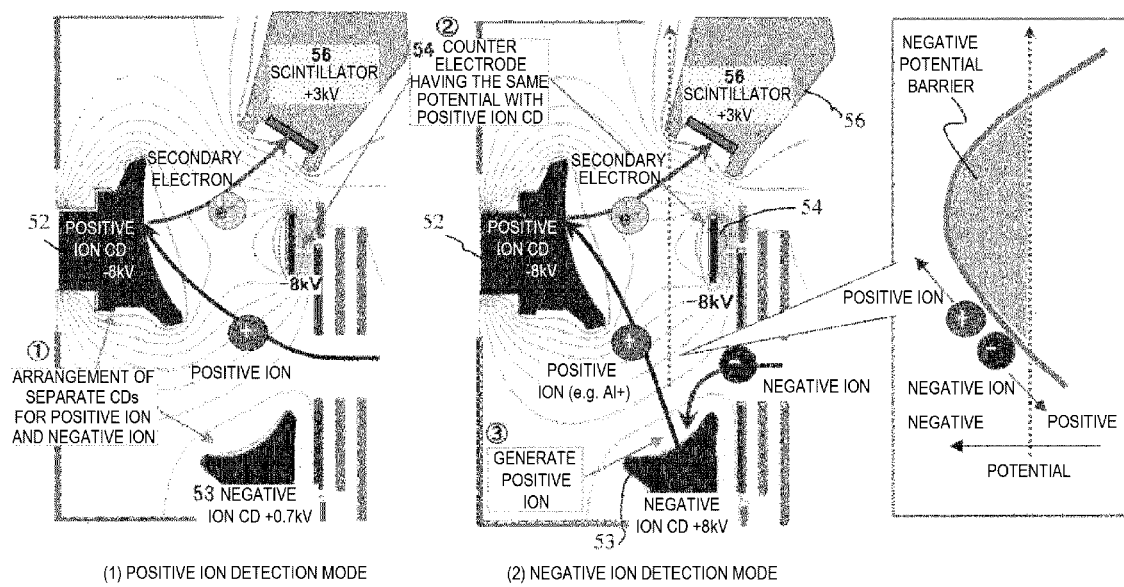
(1) POSITIVE ION DETECTION MODE
(2) NEGATIVE ION DETECTION MODE

[FIG. 5A]
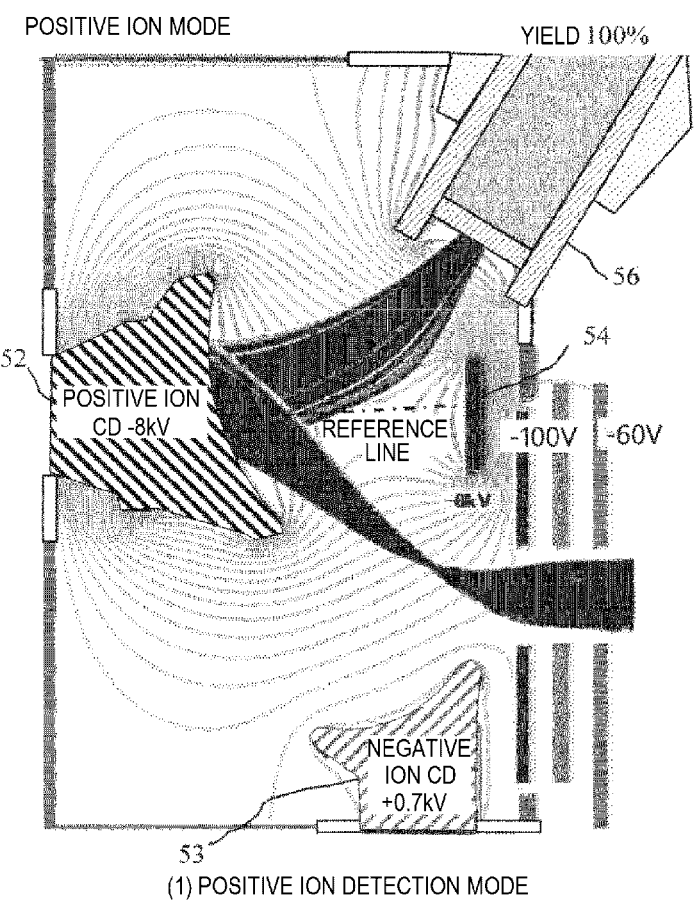
(1) POSITIVE ION DETECTION MODE

[FIG. 5B]
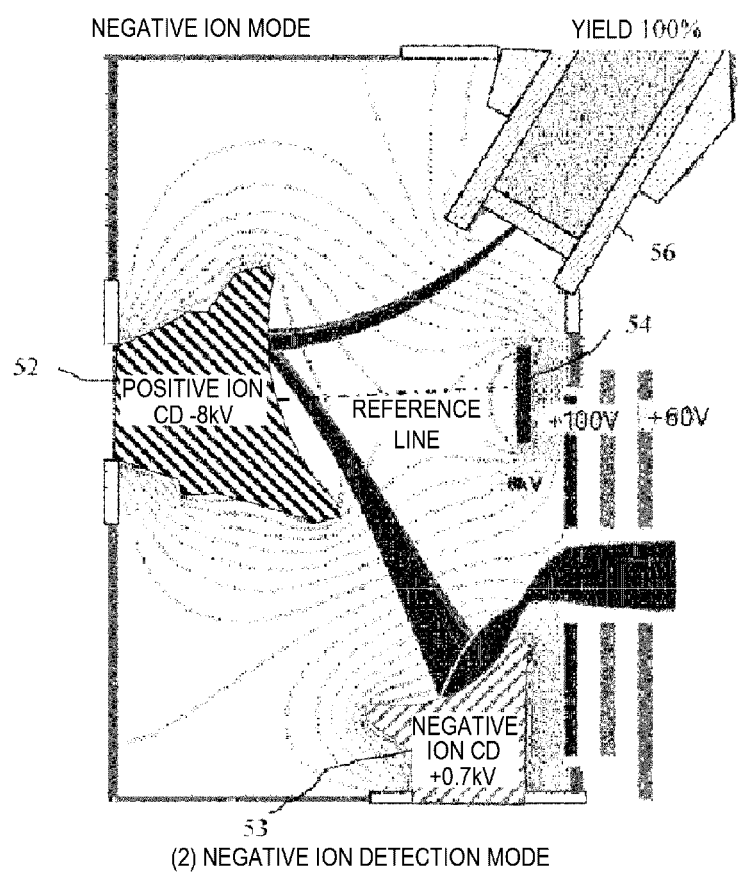
(2) NEGATIVE ION DETECTION MODE

[FIG. 6]
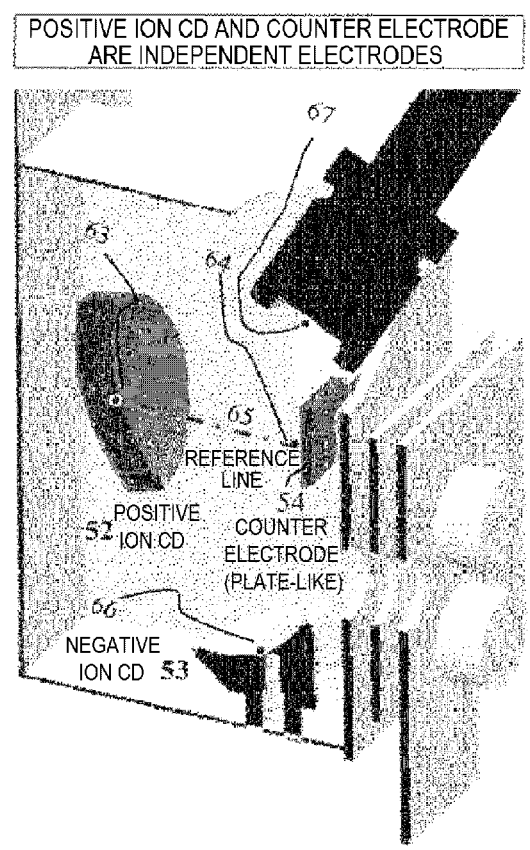

[FIG. 7]
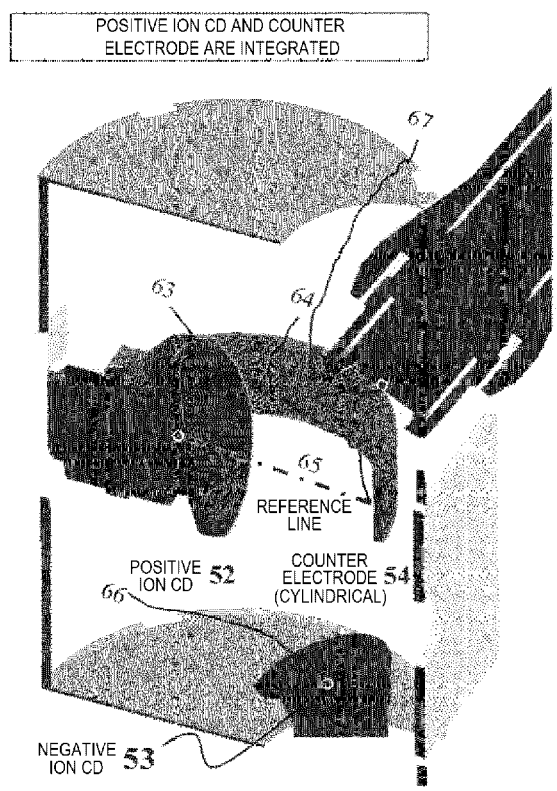

[FIG. 8A]
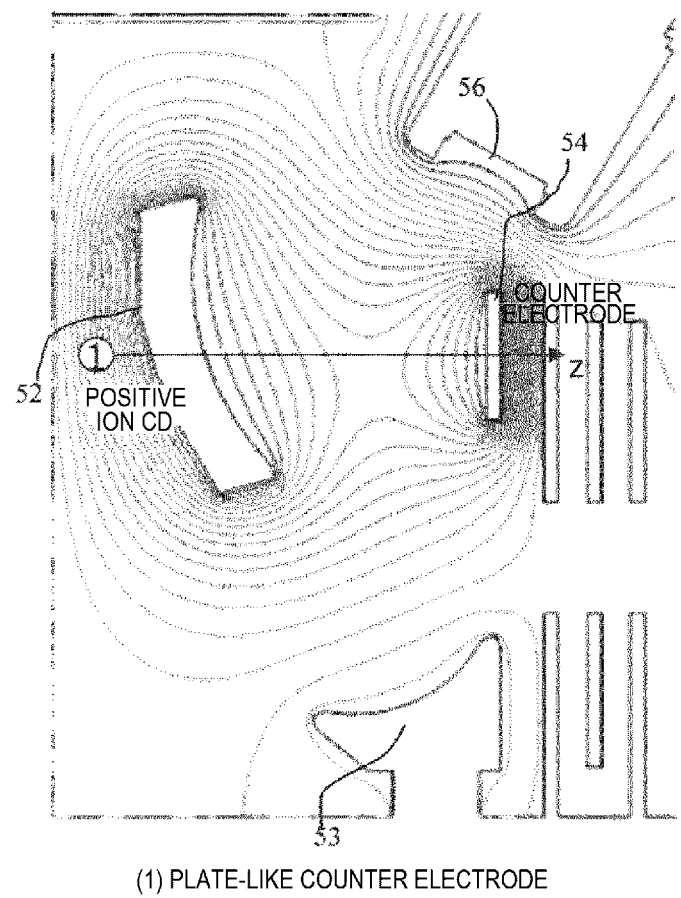
(1) PLATE-LIKE COUNTER ELECTRODE

[FIG. 8B]
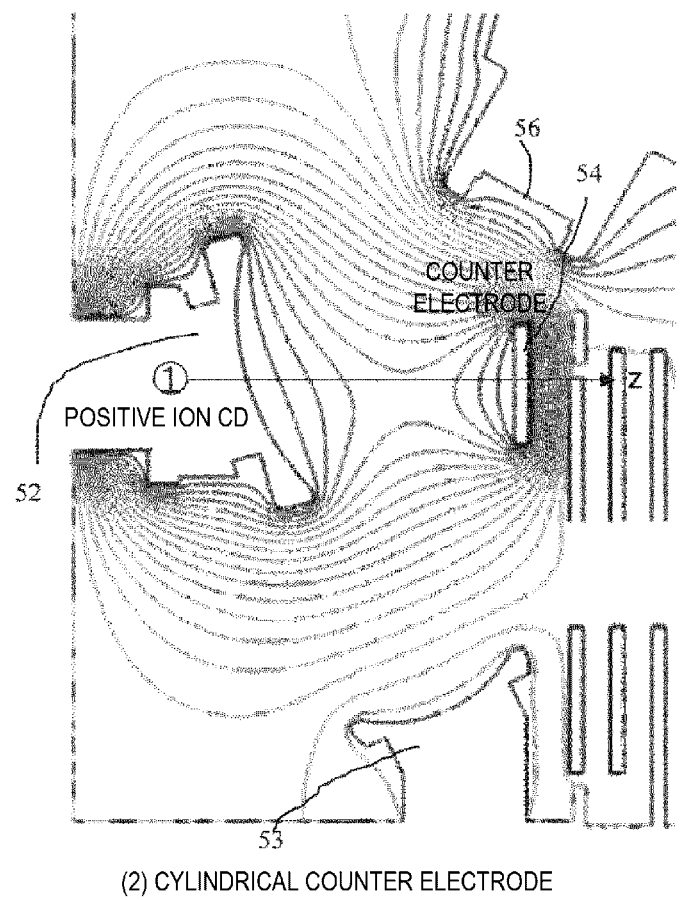
(2) CYLINDRICAL COUNTER ELECTRODE

[FIG. 9]
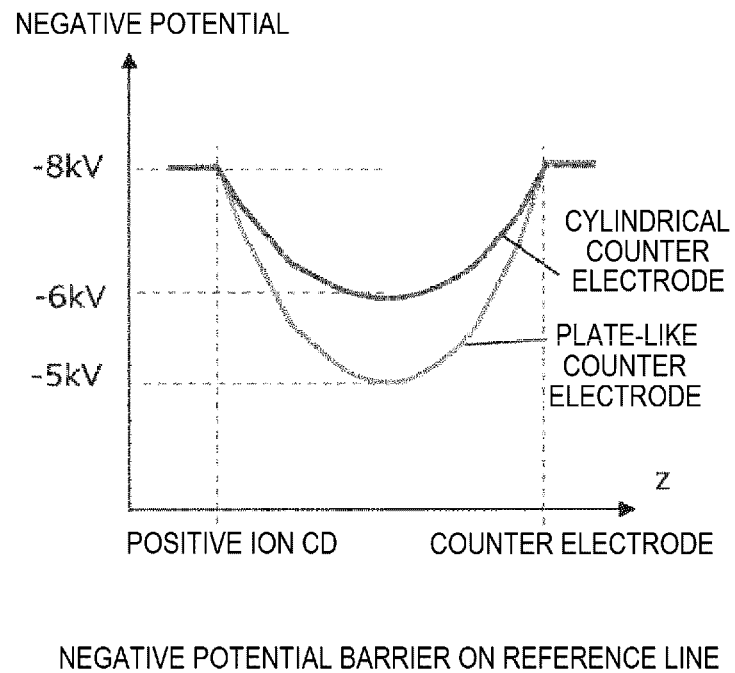
NEGATIVE POTENTIAL BARRIER ON REFERENCE LINE

[FIG. 10]
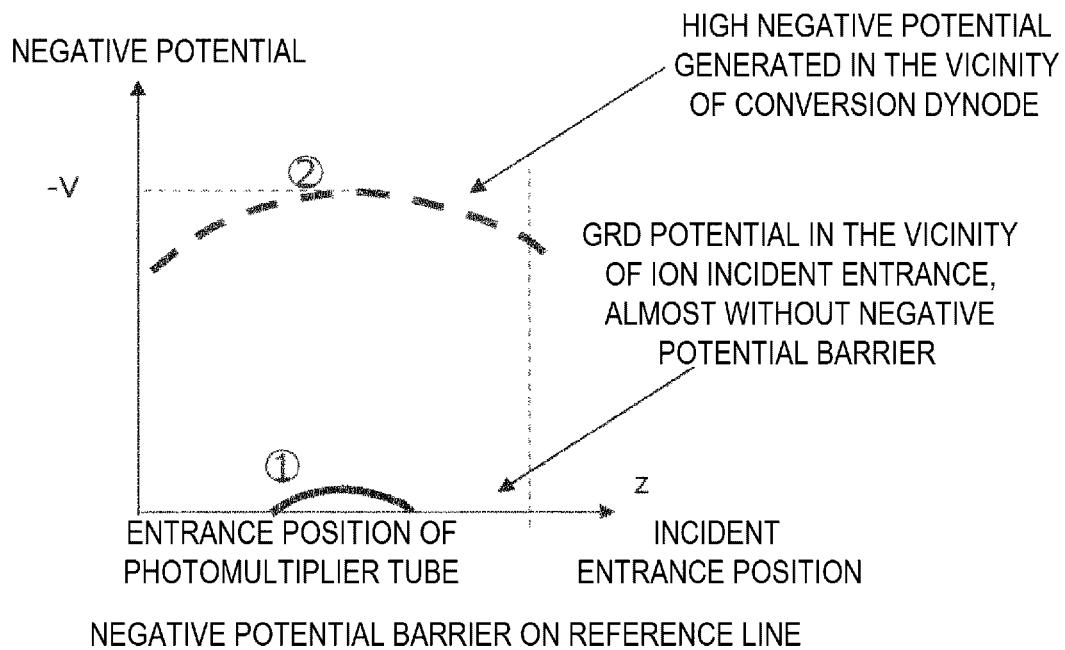
NEGATIVE POTENTIAL BARRIER ON REFERENCE LINE

[FIG. 11]
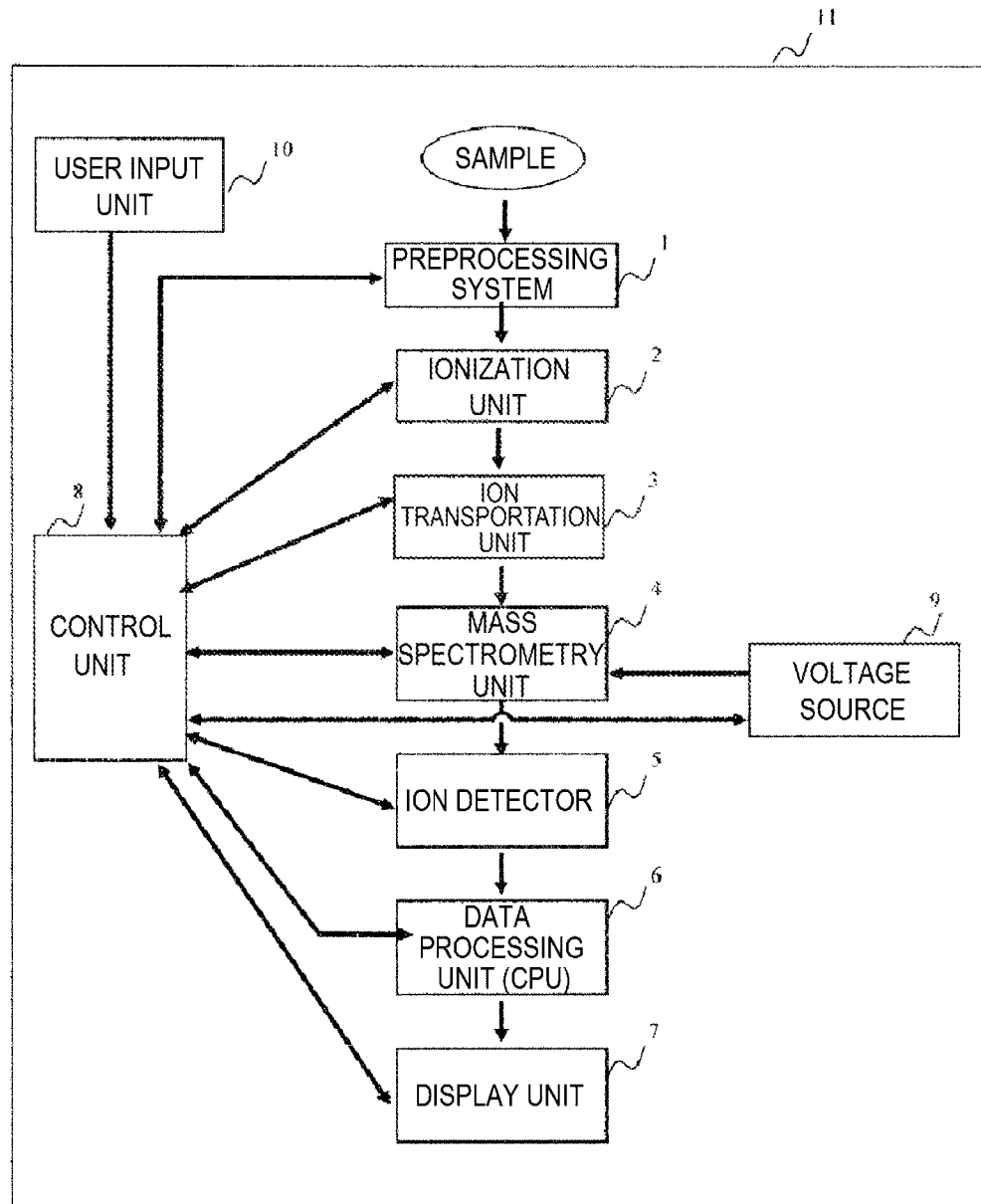

[FIG. 12]
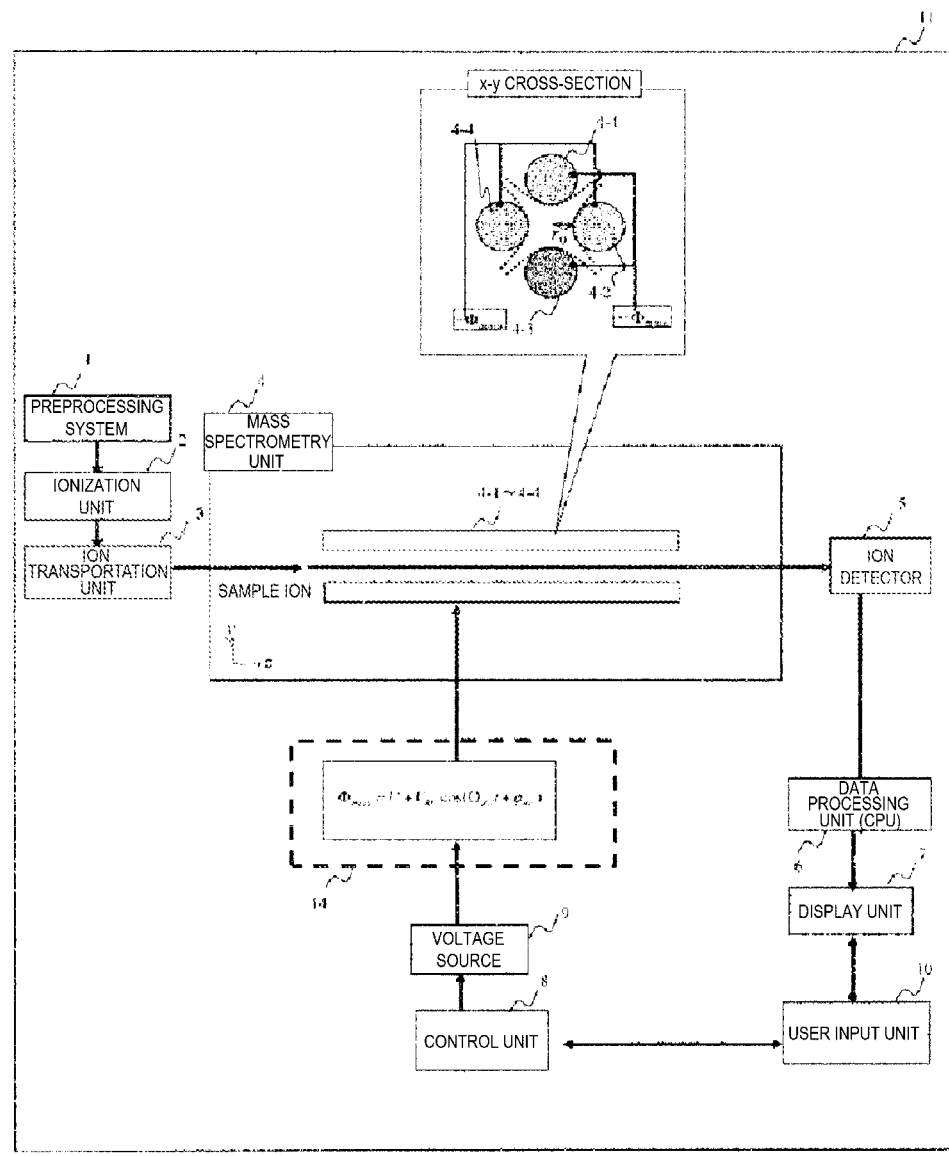

[FIG. 13]
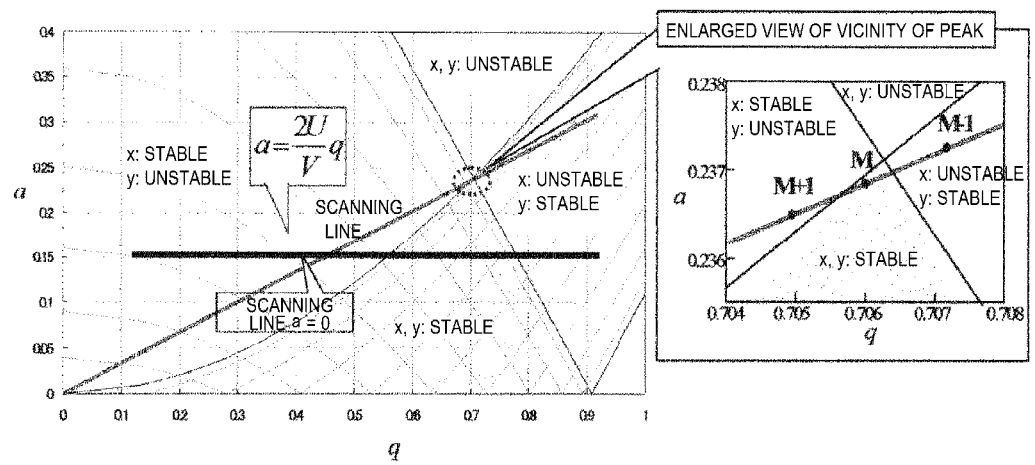

[FIG. 14]
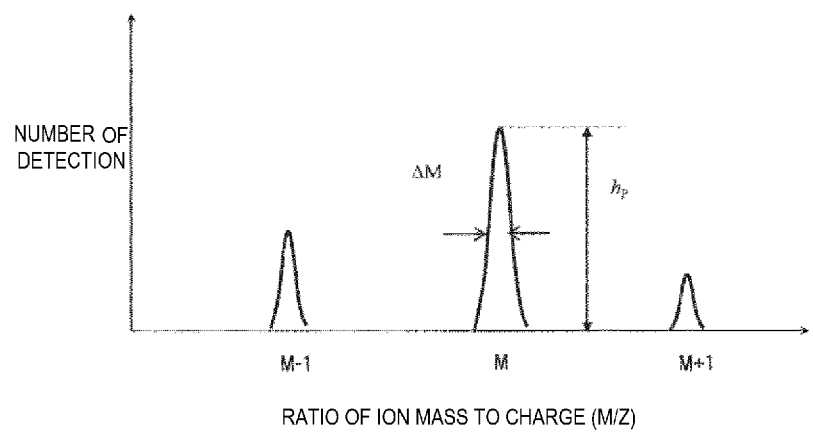

[FIG. 15]
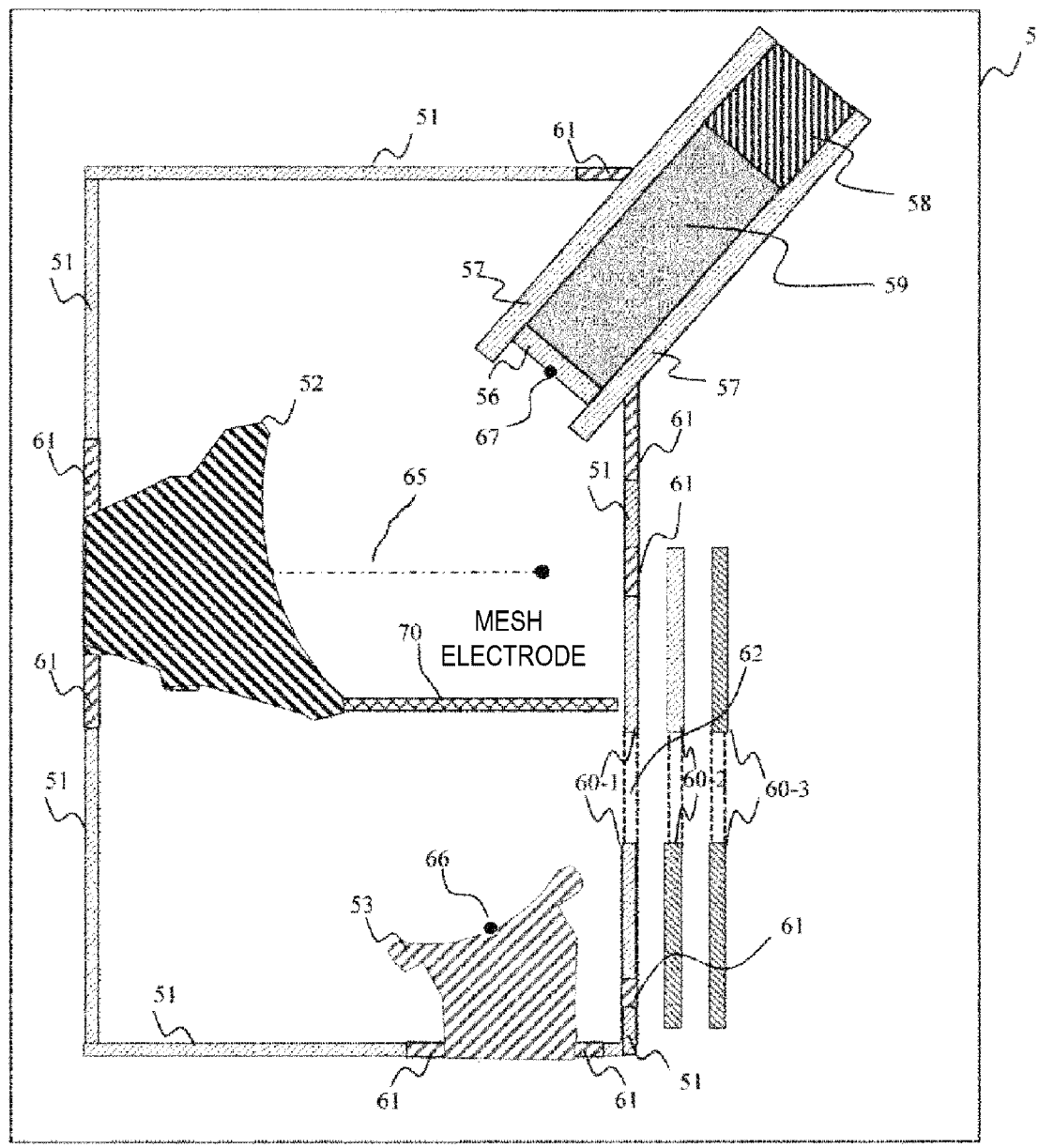

[FIG. 16]
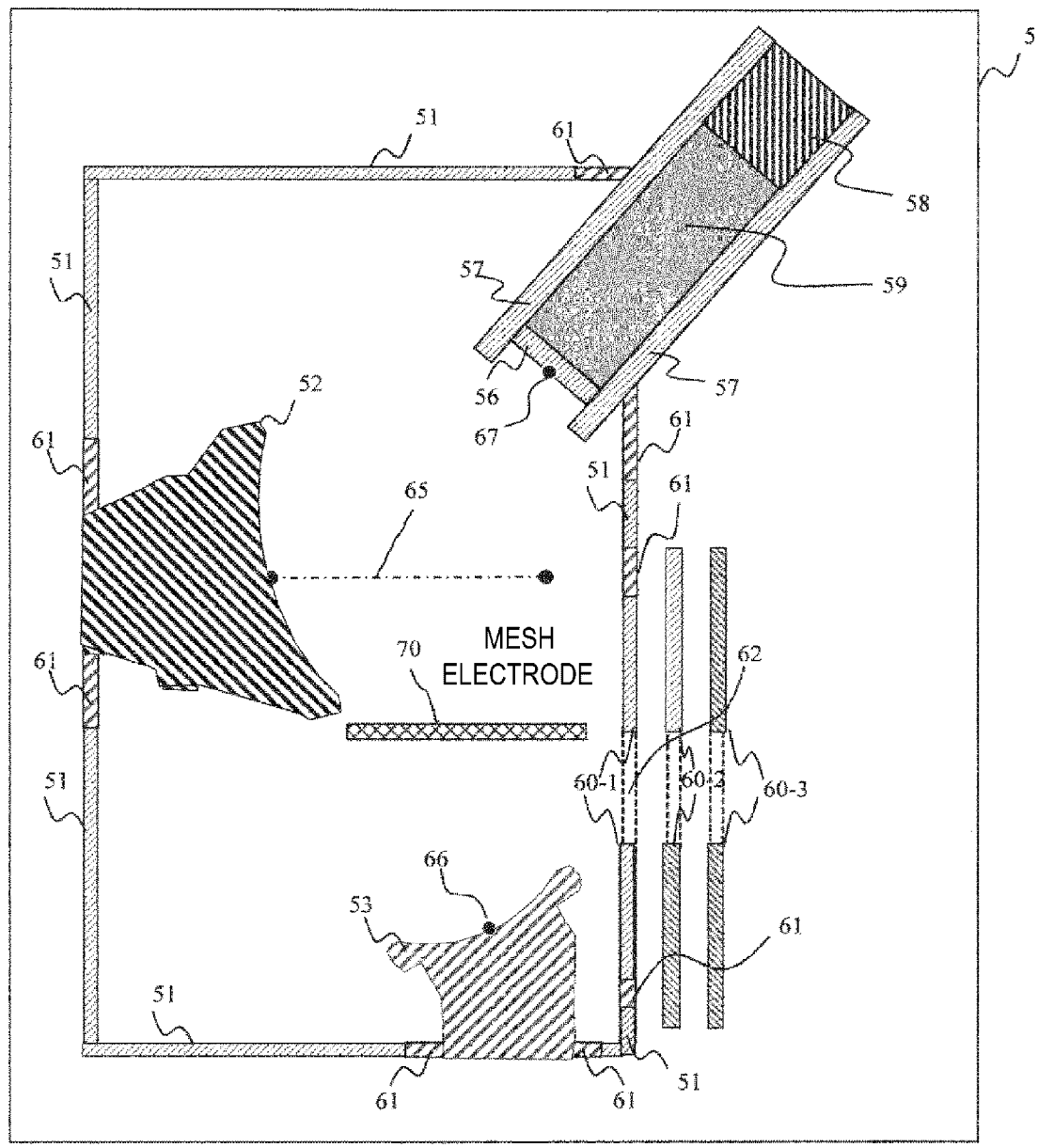

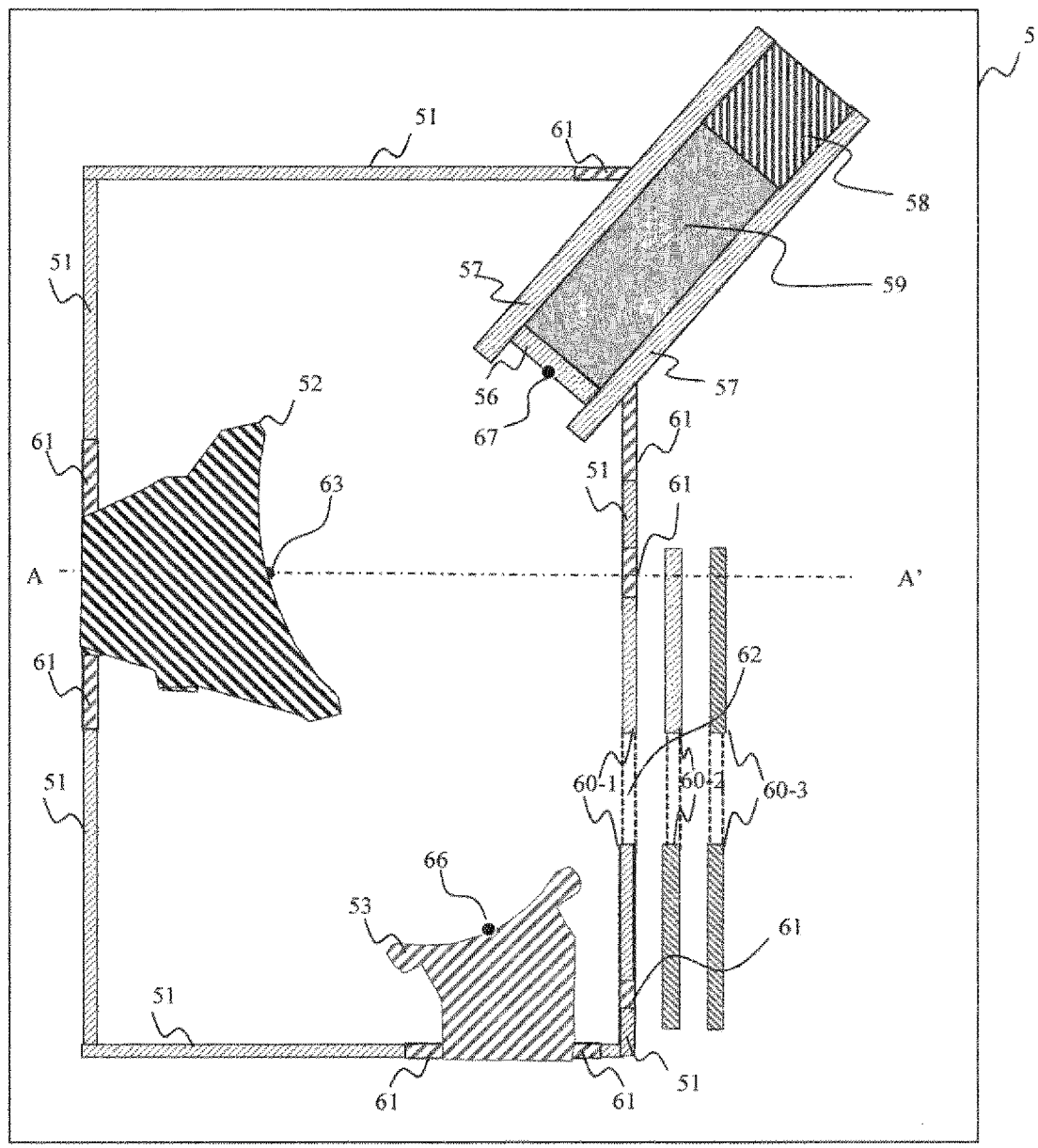
[FIG. 17]

[FIG. 18]
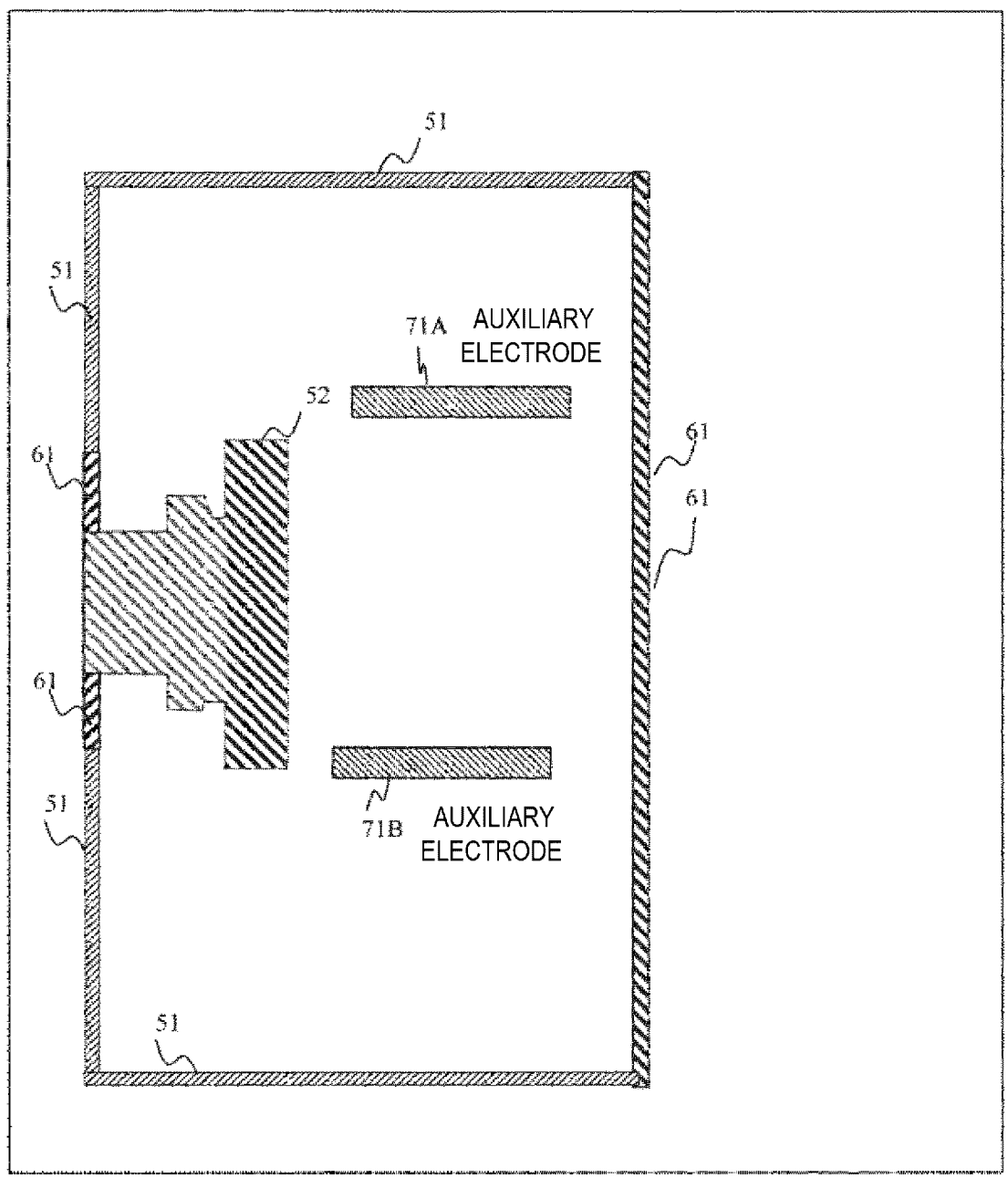

[FIG. 19]
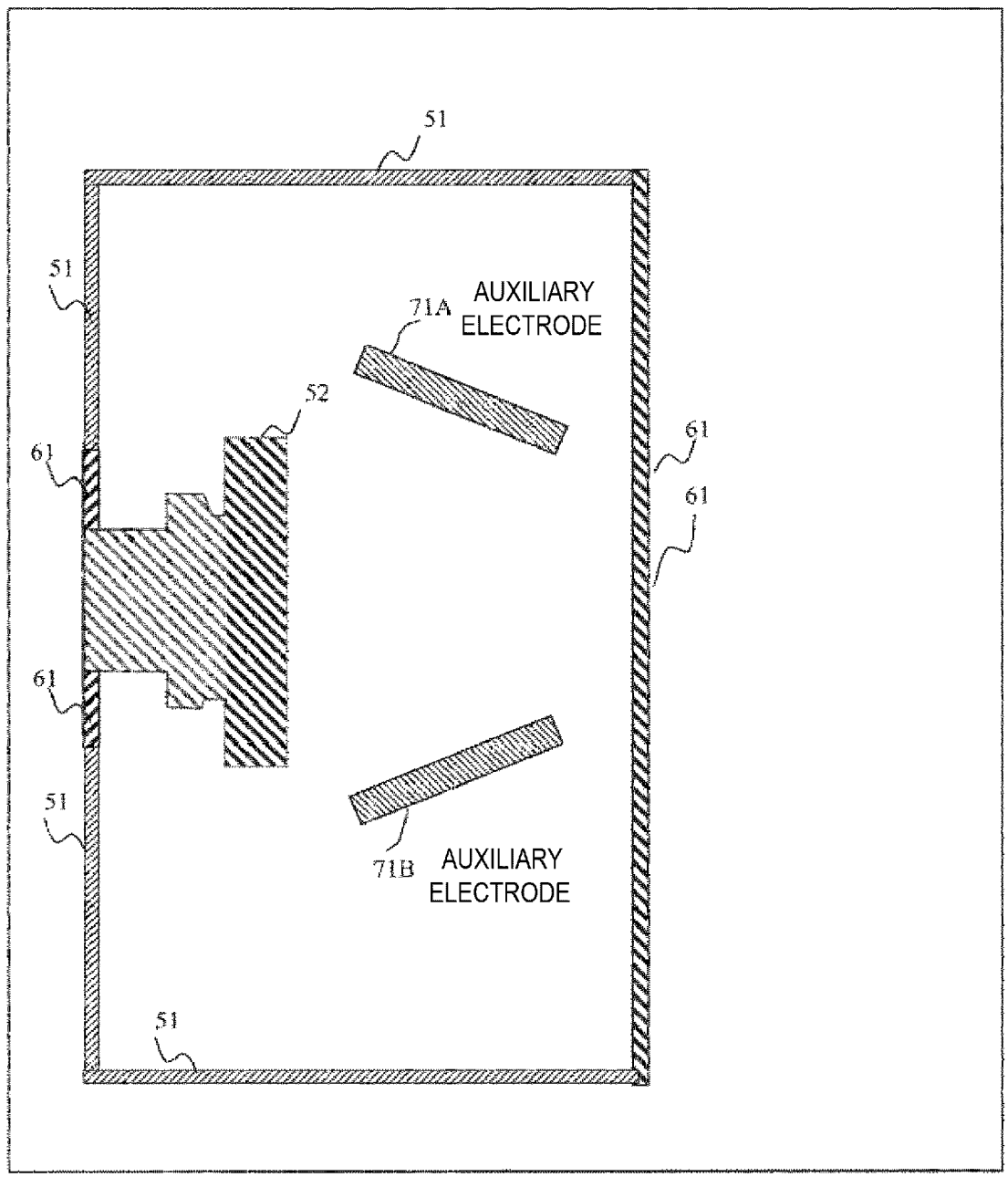

[FIG. 20]
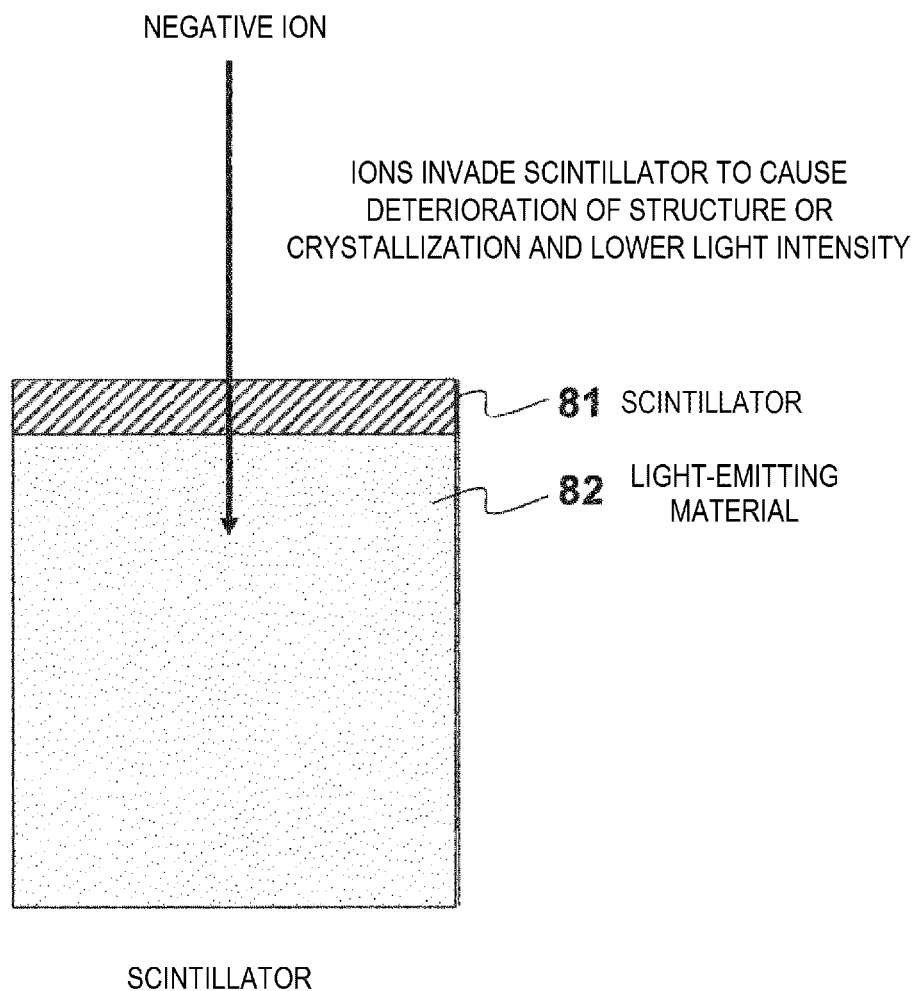

ION DETECTOR

TECHNICAL FIELD

The present invention relates to an ion detector detecting positive and negative ions.

BACKGROUND ART

In the related art, there are known ion detectors including a conversion dynode which emits secondary electrons due to ion collision, a scintillator which emits light due to the entrance of the secondary electrons emitted from the conversion dynode, and a photodetector which detects the light emitted by the scintillator.

In general, there are many devices that detect positive ions as detection targets. The positive ions collide with a conversion dynode (CD) applied with a negative potential, and secondary electrons generated at that time enter a scintillator installed at a position facing the CD to emit light, and the light is detected by a light guide and photomultiplier tubes.

On the other hand, in a case where negative ions are to be detected by the same detection device, a Coulomb force acts on the scintillator applied with a positive potential, and the negative ions directly collide with the scintillator. At this time, Al+ ions (positive ions) are generated from an Al layer on the surface of the scintillator and collide with the CD applied with a negative potential, the secondary electrons generated at that time collide with the scintillator to emit light, and the light is detected.

JP-A-2001-351566 (PTL 1) discloses an ion detector having a high sensitivity and a small dimension in an ion entrance direction. In the technique described in PTL 1, a conversion dynode for negative ion detection and a conversion dynode for positive ion detection are disposed asymmetrically with respect to an electron multiplier, an ion deflection electrode is disposed so as to face the conversion dynode for positive ion detection, and strut electrodes are disposed in the vicinity.

Both the ion deflection electrode and the strut electrode have a ground potential, the entering positive ions are directed to the conversion dynode for positive ion detection, and the electrons emitted from the conversion dynode for positive ion detection are allowed to effectively enter the entrance-opening of the electron multiplier.

CITATION LIST

Patent Literature

PTL 1: JP-A-2001-351566
PTL 2: Japanese Patent No. 5818542

SUMMARY OF INVENTION

Technical Problem

In an ion detector of the related art, there is a high possibility that negative ions directly collide with a scintillator during the detection of the negative ions.

FIG. 20 illustrates a general structure of a scintillator. In FIG. 20, when negative ions directly collide with the scintillator, there is a high possibility that the negative ions will pass through a conductive layer on a surface of a scintillator 81 and reach a light-emitting layer (light guide) 82 made of GaN or the like. In that case, a phenomenon occurs in which a crystal arrangement of the light-emitting layer 82 is damaged to allow the crystal to collapse, or negative ion elements as impurities are injected into the crystal to change a band structure, and thus, an original light-emitting mechanism is hindered, which may cause a decrease in light emission intensity or degradation of the scintillator.

Therefore, in order to prolong the life of the scintillator and reduce the need for maintenance, it is necessary to avoid direct collision of the negative ions with the scintillator.

Since the technique described in PTL 1 is not intended to avoid the collision of the negative ions with the scintillator, there is a possibility that some of the entering negative ions are not directed to the conversion dynode for negative ion detection but directed to the entrance-opening of the electron multiplier.

The invention is to provide an ion detector which detects both positive and negative ions and to implement an ion detector with which it is possible to avoid direct collisions of negative ions with a scintillator, prevent degradation of the scintillator, prolong the life of the scintillator, reduce the need for maintenance, and achieve highly sensitive detection of both positive and negative ions.

Solution to Problem

In order to solve the above problems, the invention is configured as follows.

There is provided an ion detector detecting positive and negative ions including: a casing in which an ion entrance for allowing the positive ions and the negative ions to enter is formed; a positive ion conversion dynode which is disposed in the casing and applied with a negative potential; a scintillator which is disposed in the casing and has an electron entering surface on which secondary electrons emitted from the positive ion conversion dynode enter; a photodetector which detects light emitted by the scintillator according to the entering of the secondary electrons; a negative potential barrier generation electrode which generates a negative potential barrier between the scintillator and the ion entrance; and a negative ion conversion dynode which is disposed in the casing and applied with a positive potential or a ground potential. The positive ion conversion dynode is installed at a distance closer to the scintillator than the negative ion conversion dynode, and the negative potential barrier generation electrode is a counter electrode which faces the positive ion conversion dynode and is applied with a negative potential equivalent to or different from the negative potential applied to the positive ion conversion dynode.

Advantageous Effects of Invention

According to the invention, it is possible to implement an ion detector which detects both positive and negative ions and with which it is possible to avoid direct collisions of negative ions with a scintillator, prevent degradation of the scintillator, prolong the life of the scintillator, reduce the need for maintenance, and achieve highly sensitive detection of both positive and negative ions.

BRIEF DESCRIPTION OF DRAWINGS

FIG. 1 is a schematic view of a positive and negative ion detector according to a first embodiment of the invention.
FIG. 2A is a view illustrating an operation at the time of detecting positive ions of an ion detector according to PTL 2 whose principle is different from the invention.

FIG. 2B is a view illustrating an operation at the time of detecting negative ions of the ion detector according to PTL 2 whose principle is different from the invention.

FIG. 3A is a view illustrating an operation at the time of detecting positive ions of an ion detector according to a principle of the invention.

FIG. 3B is a view illustrating an operation at the time of detecting negative ions of the ion detector according to the principle of the invention.

FIG. 4 illustrates potential distribution maps of a positive ion detection mode and a negative ion detection mode according to the first embodiment of the invention.

FIG. 5A is a view illustrating an ion trajectory in the positive ion detection mode according to the first embodiment of the invention.

FIG. 5B is a view illustrating an ion trajectory in the negative ion detection mode according to the first embodiment of the invention.

FIG. 6 is a three-dimensional cross-sectional view illustrating a shape of a counter electrode facing a positive ion CD according to the first embodiment of the invention.

FIG. 7 is a three-dimensional cross-sectional view illustrating a shape of a counter electrode facing a positive ion CD according to a second embodiment of the invention.

FIG. 8A is an equipotential line diagram illustrating a potential distribution analysis result according to the first embodiment of the invention.

FIG. 8B is an equipotential line diagram illustrating a potential distribution analysis result according to the second embodiment of the invention.

FIG. 9 is a graph illustrating an analysis result of a negative potential barrier on a reference line according to the first and the second embodiments of the invention.

FIG. 10 is a diagram illustrating a negative potential barrier according to a known technique.

FIG. 11 is an overall schematic configuration diagram of a mass spectrometer according to a third embodiment of the invention.

FIG. 12 is a schematic view illustrating a mass spectrometry unit according to the third embodiment of the invention.

FIG. 13 is a stable transmission region diagram illustrating stability and instability during ion transmission in a quadrupole mass spectrometer.

FIG. 14 is a schematic diagram of amass spectrum that is a mass spectrometry result.

FIG. 15 is a schematic view of a positive and negative ion detector according to a fourth embodiment of the invention.

FIG. 16 is a schematic view of a modification of the positive and negative ion detector according to the fourth embodiment of the invention.

FIG. 17 is a view illustrating a positive and negative ion detector according to a fifth embodiment of the invention.

FIG. 18 is a schematic view of the positive and negative ion detector according to the fifth embodiment of the invention.

FIG. 19 is a schematic view of a modification of the positive and negative ion detector according to the fifth embodiment of the invention.

FIG. 20 is a diagram illustrating a general structure of a scintillator.

DESCRIPTION OF EMBODIMENTS

Hereinafter, embodiments of the invention will be described with reference to the drawings.

First, the outline of the invention will be described.

FIGS. 2A and 2B illustrate operations of an ion detector of PTL 2 whose principle is different from the invention.

In FIG. 2A, a conversion dynode 80 which emits secondary electrons due to collision of ions, a scintillator 81 which emits light due to the entering of the secondary electrons emitted from the conversion dynode 80, and a photomultiplier tube (photodetector) 83 which detects the light emitted by the scintillator 81 through a light guide 82 are provided.

Usually, there are many devices that detect positive ions as detection targets. As illustrated in FIG. 2A, the positive ions (m+) collide with the conversion dynode (CD) 80 applied with a negative potential, the secondary electrons generated at that time enter the scintillator 81 installed at a position facing the CD 80 to emit light, and the light is detected by the light guide 82 and the photomultiplier tube 83.

On the other hand, when the negative ions are detected, as illustrated in FIG. 2B, a Coulomb force acts on the scintillator 81 applied with a positive potential, and thus, the negative ions (m−) directly collide with the scintillator 81. At this time, Al+ ions (positive ions) are generated from the Al layer on the surface of the scintillator 81 and collide with the CD 80 applied with a negative potential, and the secondary electrons generated at that time collide with the scintillator 81, so that emission of the light is detected.

As illustrated in FIG. 2B, the direct collision of the negative ions (m−) with the scintillator 81 causes great damage to the scintillator 81.

FIGS. 3A and 3B are diagrams illustrating an ion detector based on the principle of the invention.

In FIGS. 3A and 3B, the ion detector includes a positive ion conversion dynode 52 applied with a negative potential and emitting secondary electrons due to collision of positive ions, a counter electrode 54 (plate-like electrode) which faces the positive ion conversion dynode 52 and applied with a negative potential, a negative ion conversion dynode 53 which is disposed on an ion entrance side from a reference line connecting a central point of the positive ion conversion dynode 52 and a central point of the counter electrode 54 and applied with a positive potential, a scintillator 56 which is located in a region opposite to a region where the ion entrance is located with interposing the reference line, a light guide 59, and a photomultiplier tube (photodetector) 58.

In FIG. 3A, the positive ions (m+) entering from the ion entrance collide with the positive ion conversion dynode 52 applied with a negative potential, and the secondary electrons generated at that time enter the scintillator 56 having an electron entering surface to emit light, and the light is detected by the light guide 59 and the photomultiplier tube 58.

On the other hand, when detecting the negative ions, as illustrated in FIG. 3B, the negative ions (m−) entering from the ion entrance collide with the negative ion conversion dynode 53 applied with a positive potential, Al+ ions (positive ions) are generated and collide with the positive ion conversion dynode 52 applied with a negative potential, and the secondary electrons generated at that time enter the scintillator 56 to emit light, and the light is detected by the light guide 59 and the photomultiplier tube 58.

As illustrated in FIG. 3B, since the negative potential barrier is formed by the reference line connecting the central point of the positive ion conversion dynode 52 and the central point of the counter electrode 54, the negative ions (m−) entering from the ion entrance do not move directly toward the scintillator 56 but move toward the negative ion conversion dynode 53 to collide.

Therefore, it is possible to avoid direct collision of the negative ions with the scintillator 56.

Embodiment

First Embodiment

FIG. 1 is a schematic configuration diagram of an ion detector which detects both positive and negative ions according to a first embodiment of the invention.

In FIG. 1, the ion detector 5 is surrounded by a casing (chamber) 51 made of stainless steel (SUS) or the like, and an opening (ion entrance) 62 through which the ions enter is formed in a portion of the casing 51. The ion opening 62 is formed in the casing 51 via an insulating material 61.

Entrance electrodes 60-1, 60-2, and 60-3, which are entrance electrode systems having openings of the same size as the ion entrance 62 may be provided in front of the ion entrance 62, and according to the polarity of the ions (positive ion or negative ion), the polarity of the applied voltage is also changed.

For example, the voltages applied to the entrance electrodes 60-1, 60-2, and 60-3 are changed in polarity, for example, between −60 V, −80 V, and −100 V for positive ions and +60 V, +80 V, and +100 V for negative ions.

In addition, the same voltage may be applied to the entrance electrodes 60-1, 60-2, and 60-3. In addition, the conversion dynodes (CD) for colliding the positive ions and the negative ions are separately provided in the casing 51. A positive voltage or a ground voltage is applied to the negative ion CD 53, and a negative voltage is applied to the positive ion CD 52. The positive ion CD 52 and the negative ion CD 53 are provided in the casing 51 via the insulating material 61.

In addition, as illustrated three-dimensionally in FIG. 6, the plate-like counter electrode 54 is installed at a position facing the positive ion CD 52, and a scintillator 56 is installed above the counter electrode 54. The scintillator 56, the light guide 59, and the photomultiplier tube 58 are disposed in a light guide outer wall 57, and the light guide outer wall 57 is provided to the casing 51 via the insulating material 61. The scintillator 56 contains, for example, gallium nitride (GaN).

The negative ion CD 53, the positive ion CD 52, the counter electrode 54 for the positive ion CD 52, and the scintillator 56 are arranged as follows.

With a line connecting a central point 63 of a collision surface of the positive ion CD 52 and a central point 64 of a facing surface of the counter electrode 54 on the CD 52 side as a reference line 65 or a surface including the reference line 65 and perpendicularly intersecting a line connecting a central point 66 of a collision surface of the negative ion CD 53 and a central point 67 of a collision surface of the scintillator 56 as a reference surface, the central point 66 of the collision surface of the negative ion CD 53 is disposed to be located in a region on a side opposite to a region on a side where the central point 67 of the collision surface of the scintillator 56 is located with respect to the reference line 65 or the reference surface.

By arranging in this manner, a potential distribution as illustrated as an example of (1) positive ion detection mode and (2) negative ion detection mode in FIG. 4 is formed. An example of the result of analyzing the ion trajectory at this time is illustrated in FIGS. 5A and 5B.

For example, in the case of the positive ions, as illustrated in FIG. 5A, the positive ions passing through the entrance electrode systems 60-1 to 60-33 and entering from the ion entrance 62 receive a deflecting force toward the positive ion CD 52 due to the electric field generated between the negative ion CD 53 applied with a positive voltage and the positive ion CD 52 and collide with the positive ion CD 52. The secondary electrons generated at that time travel in the direction of the scintillator 56 due to the electric field generated between the positive ion CD 52 and the scintillator 56 and collide with the scintillator 56. At that time, light is generated from the scintillator 56, and the light is detected by the photomultiplier tube 58 through the light guide 59.

On the other hand, in the case of the negative ions, as illustrated in FIG. 5B, since a negative potential barrier is generated along the reference line 65 around the reference line 65 between the positive ion CD 52 and the counter electrode 54, the negative ions entering from the ion entrance 62 do not travel in the direction of the scintillator 56 on the other side of the negative potential barrier. The negative ions are attracted to collide with the negative ion CD 53 applied with a positive voltage, in front of the reference line 65 (on the ion entrance 62 side).

At this time, the secondary electrons are also generated, but since the secondary electrons are attracted toward the negative ion CD 53 similarly to the negative ions, the secondary electrons are not emitted from the negative ion CD 53.

The positive ions generated by the metal elements constituting the negative ion CD 53 rebounding due to the impact of the negative ion collision are emitted from the negative ion CD 53 and collide with the positive ion CD 52.

The secondary electrons generated at that time travel in the direction of the scintillator 56 due to the electric field generated between the positive ion CD 52 and the scintillator 56 and collide with the scintillator 56. At that time, light is generated from the scintillator 56, and the light is detected by the photomultiplier tube 58 through the light guide 59.

As can be understood from FIG. 5A and the above description, the position where most of the positive ions entering from the ion entrance 62 collide with the positive ion conversion dynode 52 becomes a position closer to the scintillator 56 than the position of the central point 63 of the positive ion conversion dynode 52 of the reference line 65 in which the negative potential barrier is generated.

In addition, as can be understood from FIG. 5B and the above description, the position where most of the positive ions of the metal generated after the negative ions entering from the ion entrance 62 collide with the negative ion conversion dynode 53 becomes a position closer to the scintillator 56 than the position of the central point 63 of the positive ion conversion dynode 52 on the reference line 65 where the negative potential barrier is generated.

The counter electrode 54 is a separate body from the positive ion conversion dynode 52 and can apply a negative potential equivalent to the negative potential applied to the positive ion conversion dynode 52 or a negative potential different from the negative potential applied to the positive ion conversion dynode 52.

As described above, according to the first embodiment, both positive and negative ions are detected with high efficiency without directly colliding with the scintillator 56, so that degradation of the scintillator 56 can be prevented. As a result, the life of the scintillator 56 can be prolonged, and thus, the maintenance-saving effect can be expected.

That is, according to the first embodiment of the invention, it is possible to implement an ion detector capable of avoiding direct collision of the negative ions entering from the opening 62 with the scintillator 56, preventing degradation of the scintillator 56, prolonging the life of the scintillator 56, reducing the need for maintenance, and achieving highly sensitive detection of both positive and negative ions.

It is noted that a line connecting the central point 63 of a positive ion collision surface of the positive ion conversion dynode 52, the central point 64 of the counter electrode 54, and the central point 67 of a secondary electron collision surface of the scintillator 56 constitute a triangle.

That is, the line connecting the central point 63, the central point 64, and the central point 67 does not constitute a straight line but constitutes a triangle.

Then, with interposing the reference line 65 connecting the central point 63 of the positive ion collision surface of the positive ion conversion dynode 52 and the central point 64 of the counter electrode 54, the central point 67 of the secondary electron collision surface of the scintillator 56 and the central point 66 of the negative ion collision surface of the negative ion conversion dynode 53 are disposed so as to be located in a region to face each other (the central point 66 of the negative ion collision surface of the negative ion conversion dynode 53 is located on the side opposite to the side where the central point 67 of the secondary electron collision surface of the scintillator 56 is located).

Second Embodiment

Next, a second embodiment of the invention will be described.

In the second embodiment, as illustrated three-dimensionally in FIG. 7, the counter electrode 54 of the positive ion CD 52 is an annular or cylindrical shaped electrode (cylindrical electrode). The annular or cylindrical shaped counter electrode 54 may also be integrated with the positive ion CD 52. Other configurations of the second embodiment are the same as those of the first embodiment.

As illustrated in FIG. 7, a position where a central point 64 of the counter electrode 54 has the shortest distance from the central point 63 of the collision surface of the positive ion CD 52 is set to the central point 64 of the counter electrode 54. The analysis result of the potential distribution at this time is illustrated in FIG. 8B.

FIG. 8A is a diagram illustrating an analysis result in the case of the plate-like counter electrode 54 illustrated in FIG. 6. In comparison with the case of the plate-like counter electrode 54 illustrated in FIG. 8A and the case of the cylindrical counter electrode 54 illustrated in FIG. 8B, it can been seen that the distribution of equipotential lines between the positive ion CD 52 and the counter electrode 54 is different.

For more detailed investigation, FIG. 9 illustrates the results of determining the negative potential barrier generated on the reference line 65.

In FIG. 9, it can be seen that the height of the negative potential barrier tends to be decreased in the vicinity of the center of the reference line 65 between the positive ion CD 52 and the counter electrode 54 applied with −8 kV. It can be seen that the decrease in the height of the barrier in the vicinity of the center is reduced in the annular electrode of the second embodiment than in the plate-like counter electrode of the first embodiment.

Therefore, according to the second embodiment, the same effect as that of the first embodiment can be obtained, and in addition, since the reduction of the height of the negative potential barrier is suppressed, it can be seen that the direct collision of the negative ions with the scintillator 56 can be more reliably avoided.

In addition, at this time, since the generated potential distribution becomes a cyclic distribution, a force acts in the direction of the center of the circle on the ion trajectory or the secondary electron trajectory, so that the convergence of the trajectory of the ions and the secondary electrons is improved, and thus, it is considered that the yield of the secondary electrons to the scintillator 56 is increased.

Herein, the potential distribution in a known technique (PTL 1) will be described. FIG. 10 is a graph illustrating a negative potential barrier according to the known technique. In FIG. 10, a circle 1 indicated by a solid line illustrates the negative potential barrier in the vicinity of an inlet of the electron multiplier tube in the known technique, and a circle 2 indicated by a broken line illustrates the negative potential barrier around the conversion dynode in the known technique.

In the known technique, the ion incident entrance and the inlet of the electron multiplier tube are adjacent to each other, and thus, a high negative potential barrier is not generated between the ion incident entrance, which is the GND voltage, and the inlet of the electron multiplier tube.

On the other hand, in the invention, a high negative potential is provided between the ion entrance and the scintillator 56 and between the ion entrance and the photomultiplier tube 58, and thus, the invention is significantly different from the known technique.

In addition, in comparison of the arrangement of the entire detection system between the known technique and the invention, when it is assumed that the distance between the ion incident entrance and the conversion dynode is set as L1 and the distance between the ion incident entrance and the scintillator is set as L2, in the invention, L2 is larger than L1 (L1<L2).

On the other hand, in the known technique, when the distance between the ion incident entrance and the conversion dynode is set as L1 and the distance between the ion incident entrance and the inlet of the electron multiplier tube is set as L2, L2 is smaller than L1 (L1>L2).

The known technique and the invention are significantly different in terms of the arrangement of the entire detection system.

Third Embodiment

Next, a third embodiment of the invention will be described. The third embodiment is an example in which the ion detector 5 of the first or second embodiment is applied to a mass spectrometer 11.

The ion which is a detection target of the ion detector 5 is an ion that has passed through a mass spectrometry unit 4 of the mass spectrometer 11.

FIG. 11 is an overall system configuration diagram of the mass spectrometer 11 according to the third embodiment.

In FIG. 11, the sample which is a mass spectrometry target is separated and fractionated in time by a preprocessing system 1 such as gas chromatography (GC) or liquid chromatography (LC) and sent to an ionization unit 2. In the ionization unit 2, the ionized sample ions pass through an ion transportation unit 3 and enter the mass spectrometry unit (mass spectrometer) 4 to be mass-separated.

The voltage to the mass separation unit 4 is applied from a voltage source 9 while being controlled by a control unit 8. The ion entrance 62 of the ion detector 5 is connected to the mass spectrometry unit (mass spectrometer) 4, and the ions finally separated by and passing through the mass spectrometry unit 4 enter from the ion entrance of the ion detector 5 to the ion detector 5 and are detected by the ion detector 5.

Then, the data are organized and processed by a data processing unit (CPU) 6, and the mass spectrometry data which are the analysis result are displayed on a display unit 7.

The entire series of mass spectrometry processes "ionization of sample, transporting and entering of sample ion beams to the mass spectrometry unit 4, mass separation processing, ion detection, data processing, command processing of a user input unit 10" are controlled by the control unit 8.

The control unit 8 adjusts and optimizes the positive voltage applied to the negative ion conversion dynode 53 applied with a positive potential or the ground potential. The control unit 8 fluctuates the voltage applied to the negative ion conversion dynode 53 within a certain range from a default voltage and sets the voltage with the highest sensitivity as an optimum voltage (voltage tuning is automatically performed).

The control unit 8 adjusts and optimizes the positive voltage applied to the negative ion conversion dynode 53, so that the trajectory of the positive ion entering from the ion entrance 62 is deflected, and the position of collision with the positive ion conversion dynode 52 is set as a position closer to the scintillator 56 than the position where the negative potential barrier is generated.

In addition, the control unit 8 adjusts and optimizes the positive voltage applied to the negative ion conversion dynode 53, so that the trajectory of the positive ions of the metal generated by collision of the negative ions entering from the ion entrance 62 with the negative ion conversion dynode 53 is deflected, and the position of collision with the positive ion conversion dynode 52 is set as a position closer to the scintillator 56 than the position where the negative potential barrier is generated.

Herein, as illustrated in FIG. 12, the mass spectrometry unit 4 is configured with a quadrupole mass spectrometer (quadrupole mass spectrometer (QMS)) including four rod-like electrodes 4-1, 4-2, 4-3, and 4-4. It is noted that a multipolar mass spectrometer configured with four or more rod-like electrodes may be used.

In addition, in the case of a quadrupole electrode system in which the ion transportation unit 3 is configured with four rod-like electrodes, the electrode system may serve as an ion guide by applying only a high frequency voltage.

In addition, as illustrated in FIG. 12, when it is assumed that the longitudinal direction of the rod-like electrodes 4-1 to 4-4 is set as the z direction and the cross-sectional direction is set as the x-y plane, as illustrated in the x-y cross section of the rod-like electrodes 4-1 to 4-4, the four rod-like electrodes 4-1 to 4-4 may be cylindrical electrodes, or rod-like electrodes having a bipolar surface shape as illustrated by the dotted line may be used.

Electrodes facing each other in the four electrodes 4-1 to 4-4 of the QMS in the mass spectrometry unit 4 are set as a set, a voltage (+(U+VRF cos(ΩRF·t+ϕRF))) obtained by superimposing a DC voltage and a high frequency voltage is applied to the electrodes 4-1 and 4-3, the opposite phase voltage (−(U+VRF cos(ΩRF·t+ϕRF))) is applied to the electrodes 4-2 and 4-4, and high-frequency electric fields Ex and Ey expressed by the following Mathematical Formula (1) are generated between each of the four rod-like electrodes 4-1 to 4-4.

It is noted that the voltage (U+VRF cos(ΩRF·t+ϕRF)) is denoted by reference numeral 14 in FIG. 12.

[Mathematical Formula 1]

$$E_x = -\frac{\partial \Phi_{main}}{\partial x} = -\frac{2(U + V_{RF}\cos(\Omega_{RF}1 + \phi_{RF}))}{r_0^2} \cdot x, \quad (1)$$

$$E_y = -\frac{\partial \Phi_{main}}{\partial y} = -\frac{2(U + V_{RF}\cos(\Omega_{RF}1 + \phi_{RF}))}{r_0^2} \cdot y$$

The ionized sample ions are introduced along the central axis (z direction) between the rod-like electrodes 4-1 to 4-4 and pass through the high-frequency electric field of Mathematical Formula (1). The stability of the ion trajectories in the x and y directions at this time is determined by dimensionless parameters a and q expressed in the following Mathematical Formulas (2) and (3) derived from the equation of motion (Mathieu equation) of the ions between the rod-like electrodes 4-1 to 4-4.

[Mathematical Formula 2]

$$a = \frac{8eZU}{\Omega_{RF}^2 m r_0^2} \quad (2)$$

[Mathematical Formula 3]

$$q = \frac{4eZV_{RF}}{\Omega_{RF}^2 m r_0^2} \quad (3)$$

Herein, the dimensionless parameters a and q are stability parameters in the QMS. In Mathematical Formulas (2) and (3), m is an ion mass, Z is a charge value of the ion, r0 is a half value of the distance between facing rod (rod-like) electrodes, e is an elementary charge, m/Z is a mass-to-charge ratio of ions, U is a DC voltage applied to the rod electrode, and VRF and ΩRF are amplitude and angular vibration frequency of a high frequency voltage.

When the values of r0, U, VRF, and ΩRF are determined, the respective ion species correspond to different (a,q) points on the a-q plane illustrated in FIG. 13 according to the mass-to-charge ratio m/Z. At this time, from Mathematical Formulas (2) and (3), all the different (a,q) points of the respective ion species exist on the straight line of the following Mathematical Formula (4).

[Mathematical Formula 4]

$$a = \frac{2U}{V_{RF}} q \quad (4)$$

FIG. 13 illustrates a quantitative range (stable transmission region) of a and q that give a stable solution to the ion trajectory in both the x and y directions. In order to allow only ion species having a specific mass-to-charge ratio m/Z to pass through between the rod-like electrodes and to allow other ion species to be unstably emitted out of the QMS for mass separation, it is necessary to adjust the U and VRF ratios so as to intersect the vicinity of the apex of stable transmission region illustrated in FIG. 13.

While the stably transmitted ions vibrate and pass between the rod-like electrodes in the z direction, the unstable ions diverge in vibration and emit in the x and y directions. By utilizing this point, the quadrupole mass spectrometer detects the passing ions by adjusting the voltage applied to the electrodes so that, as illustrated in FIG. 13, the operating point is set to a point in the vicinity of the apex of the stable transmission region in order to allow only ion species having a specific mass-to-charge ratio m/Z to pass through.

As a result, mass spectrum data as illustrated in FIG. 14 is obtained.

The ions that are the analysis targets of the mass spectrometer become both positive and negative ions. In particular, when a biological sample or the like is an analysis target, since the sample is very small, it is required to reduce the detection loss and perform stable and highly sensitive analysis.

For this reason, instability of the detection sensitivity due to degradation of the scintillator 56 and instability of the analysis result due to interruption of the analysis due to maintenance such as replacement of the scintillator 56 are matters to be avoided as much as possible.

According to the third embodiment, all the positive and negative ions can avoid direct collision with the scintillator 56, and there is no instability of the detection sensitivity due to the degradation of the scintillator 56 or interruption of the analysis due to the replacement of the scintillator 56, so that it is possible to implement a mass spectrometer capable of performing high sensitivity analysis with stability.

It is noted that, although the quadrupole mass spectrometer is adopted in the third embodiment, other types of mass spectrometers such as a time-of-flight type, an ion trap type, and a triple QMS type may be adopted.

In addition, the control function of the control unit 8 for the ion detector 5 may be allowed to be independent of the control functions of other units such as the mass spectrometry unit 4 and to be a control unit that controls only the ion detector 5. Such a control unit is established as a control unit of the ion detector 5 of the first and second embodiments.

Fourth Embodiment

Next, a fourth embodiment of the invention will be described.

FIG. 15 is a schematic configuration diagram of an ion detector which detects both positive and negative ions of the fourth embodiment.

In the first and second embodiments, the negative potential barrier is generated by the positive ion conversion dynode 52 and the counter electrode 54 facing the positive ion conversion dynode 52, but in the fourth embodiment, instead of the counter electrode 54, a mesh electrode 70 disposed in the vicinity of the positive ion conversion dynode 52 is used. Other configurations are the same as those of the first embodiment.

The mesh electrode 70 is an electrode in which a large number of fine openings are formed.

As illustrated in FIG. 15, the mesh electrode 70 is in contact with the end portion of the positive ion conversion dynode 52 at a position close to the opening 62 and extends toward the opening 62 in parallel to the reference line 65 described above.

Due to the negative potential barrier generated by the positive ion conversion dynode 52 and the mesh electrode 70, the negative ions entering from the opening 62 can also be prevented from directly colliding with the scintillator 56, and the same effect as that of the first embodiment can be obtained.

FIG. 16 is a diagram illustrating a modification of the example illustrated in FIG. 15.

In the example illustrated in FIG. 15, one end of the mesh electrode 70 is in contact with the positive ion conversion dynode 52, but in the example illustrated in FIG. 16, the mesh electrode 70 is not in contact with the positive ion conversion dynode 52 and extends in parallel to the reference line 65 described above toward the opening 62.

Other configurations are similar to those of the example illustrated in FIG. 15.

In the example illustrated in FIG. 16, the similar effect to that in the first embodiment can be obtained.

Fifth Embodiment

Next, a fifth embodiment of the invention will be described.

The fifth embodiment is an example in which auxiliary electrodes 71A and 71B are arranged in addition to the counter electrode 54 of the first or second embodiment.

FIG. 18 is a cross-sectional view taken along the line A-A' illustrated in FIG. 17. It is noted that, in FIGS. 17 and 18, the counter electrode 54 is not illustrated.

The auxiliary electrodes 71A and 71B illustrated in FIG. 18 facing each other are disposed so as to face each other in the direction perpendicular to the paper surface of FIG. 17 and to be parallel to each other. The voltage applied to the auxiliary electrodes 71A and 71B is about equal to the voltage applied to the counter electrode 54.

Since the auxiliary electrodes 71A and 71B are disposed, in addition to the negative potential barrier generated by the positive ion conversion dynode 52 and the counter electrode 54, the negative potential barrier is generated by the auxiliary electrodes 71A and 71B and the positive ion conversion dynode 52, so that it is possible to avoid direct collision of the negative ions entering from the opening 62 with the scintillator 56.

FIG. 19 is a diagram illustrating a modification of the example illustrated in FIG. 18.

In the example illustrated in FIG. 18, the auxiliary electrodes 71A and 71B are disposed so as to be parallel to each other, but the auxiliary electrodes 71A and 71B in the example illustrated in FIG. 19 are disposed to be inclined toward the positive ion conversion dynode 52 so as to have a V shape.

Even with the configuration illustrated in FIG. 19, the same effects as the example illustrated in FIG. 18 can be obtained.

It is noted that the auxiliary electrodes 71A and 71B may be disposed, and the counter electrode 54 may not be disposed.

As described above, in the invention, the conversion dynodes (CDs) 52 and 53 that allow the positive and negative ions to collide are separately provided, and the negative potential barrier is formed between the ion entrance 62 to the ion detector 5 and the scintillator 56, so that it is possible to avoid direct collision of the negative ions with the scintillator 56.

Accordingly, it is possible to obtain the effects such as preventing degradation of the scintillator 56, prolonging the life of the scintillator 56, reducing the need for maintenance, and achieving the high-sensitivity detection of both positive and negative ions.

Therefore, it is possible to implement an ion detector which detects both positive and negative ions and with which it is possible to avoid direct collision of negative ions with a scintillator, prevent degradation of the scintillator, prolong the life of the scintillator, reduce the need for maintenance, and achieve highly sensitive detection of both positive and negative ions.

In addition, a mass spectrometer using the ion detector can be implemented.

It is noted that the counter electrode 54, the mesh electrode 70, and the auxiliary electrodes 71A and 71B are collectively defined as a negative potential barrier generation electrode.

REFERENCE SIGNS LIST

1 preprocessing system
2 ionization unit
3 ion transportation unit
4 mass spectrometry unit
4-1, 4-2, 4-3, 4-4 four rod-like electrodes in quadrupole electrode system
5 ion detector
6 data processing unit
7 display unit
8 control unit
9 voltage source
10 user input unit
11 mass spectrometer
51 casing
52 positive ion conversion dynode (CD)
53 negative ion conversion dynode
54 counter electrode
56 scintillator
57 light guide outer wall
58 photomultiplier tube
59 light guide
60-1, 60-2, 60-3 electrode system at ion entrance
61 insulating material
62 ion entrance
63 central point of collision surface of positive ion CD
64 central point of facing surface of counter electrode
65 reference line
66 central point of collision surface of negative ion CD
67 central point of collision surface of scintillator
70 mesh electrode
71A, 71B auxiliary electrode
81 scintillator
82 light-emitting layer

The invention claimed is:

1. An ion detector that detects positive ions and negative ions, the ion detector comprising:
a casing on which an ion entrance that allows the positive ions and the negative ions to enter is formed;
a positive ion conversion dynode that is disposed in the casing and configured to be applied with a negative potential;
a scintillator that is disposed in the casing and includes an electron entering surface which secondary electrons emitted from the positive ion conversion dynode enter;
a photodetector configured to detect light emitted from the scintillator corresponding to the entering of the secondary electrons;
a negative potential barrier generation electrode configured to generate a negative potential barrier between the scintillator and the ion entrance; and
a negative ion conversion dynode that is disposed in the casing and configured to be applied with a positive potential or a ground potential,
wherein the positive ion conversion dynode is provided at a distance closer to the scintillator than the negative ion conversion dynode, and
wherein the negative potential barrier generation electrode is a counter electrode that faces the positive ion conversion dynode and is configured to be applied with a negative potential equivalent to or different from the negative potential applied to the positive ion conversion dynode.

2. The ion detector according to claim 1,
wherein the positive ions entering from the ion entrance collide with the positive ion conversion dynode, the emitted secondary electrons enter the scintillator, and light emitted from the scintillator is detected by the photodetector, and
wherein the negative ions entering from the ion entrance collide with the negative ion conversion dynode, positive ions of a metal constituting the negative ion conversion dynode collide with the positive ion conversion dynode, the emitted secondary electrons enter the scintillator, and the light emitted from the scintillator is detected by the photodetector.

3. The ion detector according to claim 2,
wherein a position where most of the positive ions entering from the ion entrance collide with the positive ion conversion dynode is a position closer to the scintillator than a position where the negative potential barrier is generated, and
wherein a position where most of the positive ions of the metal, which are generated by the negative ions entering from the ion entrance colliding with the negative ion conversion dynode, collide with the positive ion conversion dynode is a position closer to the scintillator than a position where the negative potential barrier is generated.

4. The ion detector according to claim 3, further comprising a control unit,
wherein the control unit
adjusts a positive voltage applied to the negative ion conversion dynode and deflects a trajectory of the positive ions entering from the ion entrance, so that the position where the positive ions collide with the positive ion conversion dynode is a position closer to the scintillator than the position where the negative potential barrier is generated, and
deflects a trajectory of the positive ions of the metal generated by the negative ions entering from the ion entrance colliding with the negative ion conversion dynode, so that the position where the positive ions of the metal collide with the positive ion conversion dynode is a position closer to the scintillator than the position where the negative potential barrier is generated.

5. The ion detector according to claim 1, wherein the counter electrode is an electrode integrated with the positive ion conversion dynode.

6. The ion detector according to claim 1, wherein the negative potential barrier generation electrode is a counter electrode that is configured to be applied with a negative potential different from the negative potential applied to the positive ion conversion dynode and that is separated from the positive ion conversion dynode.

7. The ion detector according to claim 1, wherein the counter electrode is a plate-like electrode.

8. The ion detector according to claim 1, wherein the counter electrode is an annular electrode or a cylindrical electrode.

9. The ion detector according to claim 1, wherein lines connecting a central point of a positive ion collision surface of the positive ion conversion dynode, a central point of the counter electrode, and a central point of a secondary electron collision surface of the scintillator form a triangle.

10. The ion detector according to claim 9, wherein the central point of the secondary electron collision surface of the scintillator and a central point of a negative ion collision surface of the negative ion conversion dynode are located in regions facing with each other, with a reference line that connects the central point of the positive ion collision surface of the positive ion conversion dynode and the central point of the counter electrode located therebetween.

11. The ion detector according to claim 1, wherein the scintillator contains gallium nitride.

12. The ion detector according to claim 1, wherein the ion entrance is configured to be connected to a mass spectrometer, and ions separated by the mass spectrometer enter from the ion entrance.

13. The ion detector according to claim 12, wherein the mass spectrometer is a quadrupole mass spectrometer.

14. The ion detector according to claim 1, wherein the negative potential barrier generation electrode is a mesh electrode disposed in the vicinity of the positive ion conversion dynode.

* * * * *